US008443336B2

(12) United States Patent (10) Patent No.: US 8,443,336 B2
Vieira et al. (45) Date of Patent: May 14, 2013

(54) SYSTEM AND METHOD FOR APPLYING MODEL-BASED TESTING TO TRAIN CONTROL SYSTEMS

(75) Inventors: Marlon E. R. Vieira, East Windsor, NJ (US); Klaus Didrich, Teltow (DE); Stefan Herbst, Görlitz (DE)

(73) Assignee: Siemens Corporation, Iselin, NJ (US)

( * ) Notice: Subject to any disclaimer, the term of this patent is extended or adjusted under 35 U.S.C. 154(b) by 1265 days.

(21) Appl. No.: 11/866,566

(22) Filed: Oct. 3, 2007

(65) Prior Publication Data

US 2009/0094575 A1 Apr. 9, 2009

(51) Int. Cl.
*G06F 9/44* (2006.01)
(52) U.S. Cl.
USPC ............ 717/104; 717/106; 717/124; 717/126
(58) Field of Classification Search .................. None
See application file for complete search history.

(56) References Cited

U.S. PATENT DOCUMENTS

| 7,930,682 | B2 * | 4/2011 | Murthy | 717/124 |
|---|---|---|---|---|
| 8,015,541 | B1 * | 9/2011 | Srinivasan et al. | 717/104 |
| 8,104,017 | B2 * | 1/2012 | Lin et al. | 717/107 |
| 8,196,090 | B2 * | 6/2012 | Chancey et al. | 717/104 |
| 2004/0088677 | A1 * | 5/2004 | Williams | 717/104 |
| 2005/0166178 | A1 * | 7/2005 | Masticola et al. | 717/104 |
| 2005/0256665 | A1 * | 11/2005 | Hartmann et al. | 702/121 |
| 2006/0174222 | A1 * | 8/2006 | Thonse et al. | 717/106 |
| 2006/0253839 | A1 * | 11/2006 | Avritzer et al. | 717/124 |
| 2007/0061776 | A1 * | 3/2007 | Ryan et al. | 717/105 |
| 2009/0037884 | A1 * | 2/2009 | Benameur et al. | 717/126 |

OTHER PUBLICATIONS

"A Train Control System Case Study in Model-Based Real Time System", Zimmermann et al., 2003, 15 pages, <www.tu-ilmenau.de/fakia/fileadmin/template/startIA/.../2003.WPDRTS.pdf>.*
Rik Eshuis, Symbolic model checking of UML activity diagrams, Jan. 2006, 38 pages, <http://delivery.acm.org/10.1145/1130000/1125809/p1-eshuis.pdf>.*
Canevet et al., Analysing UML 2.0 activity diagrams in the software performance engineering process, Jan. 2004, 5 pages, <http://delivery.acm.org/10.1145/980000/974055/p74-canevet.pdf>.*
Da Silva et al., Using the UML 2.0 activity diagram to model agent plans and actions, Jul. 2005, 7 pages, <http://delivery.acm.org/10.1145/1090000/1082563/p594-da_silva.pdf>.*
Mingsong et al., Automatic test case generation for UML activity diagrams, May 2006, 7 pages, <http://delivery.acm.org/10.1145/1140000/1138931/p2-mingsong.pdf>.*

* cited by examiner

*Primary Examiner* — Thuy Dao (57) ABSTRACT

A method for model-based testing of an industrial system includes modeling functionality of an industrial system using a modeling computer language, enhancing the model by adding functionality or refining existing functionality, generating test suites from the system model, and executing the test suites. The modeling computer language is the Unified Modeling Language (UML), wherein modeling includes defining UML use case diagrams to describe relationships among use cases specified for the system and actors who interact with the system according to the use cases, defining UML activity diagrams to model process logic of each use case, wherein the activity diagrams comprise a sequence of activities and transitions, and defining UML class diagrams to specify data categories and attributes that are inputs to the activities of the activity diagrams, wherein data categories relevant for a use case are modeled as test variables in the activity diagram.

10 Claims, 6 Drawing Sheets

SYSTEM AND METHOD FOR APPLYING MODEL-BASED TESTING TO TRAIN CONTROL SYSTEMS

TECHNICAL FIELD

This disclosure is directed to practical approaches of applying Model-Based Testing (MBT) in an industrial context.

DISCUSSION OF THE RELATED ART

Despite encouraging results achieved through quality improvement approaches, the software industry is still far from achieving defect-free software. Testing, i.e., defect identification, remains an important activity within software development and maintenance. The use of models for automatically generating test cases is a promising approach to improve the testing process. Automatic test generation has been extensively studied in recent years. Several testing approaches have been proposed based on data and/or control models. Essentially, approaches based on data models use the specification of the set of possible values to verify a parameter under test. Those approaches are very useful when the data model is sufficient to capture a (sub) system's behavior. However, if the behavior of a system depends on the sequences of actions, that is, later operations depend on actions taken by earlier operation, additional modeling (i.e., control information) is necessary in order to provide information for an effective testing. Generally, this is the case with testing embedded systems. Testing processes for embedded system share some commonalities with other applications, however in some aspects they differ. These aspects include: (a) separation between the application development and execution platforms: this leads to a critical task of verifying the application in both real and simulated environment; (b) a large variety of execution platforms and interacting devices, leading to the need for validating the interaction of the application with different devices (using real or simulated instances); (c) the emerging certification standards that should be followed: different projects can have similarities due to a standard, but several differences can also arise from customization; and (d) tight resources and timing constraints on the execution platform: in this case to run the test case in a real train in the real environment is a very expensive task that should be well planned.

Model-Based Testing (MBT) aims to automatically generate an efficient set of test cases based on a system's description (i.e., models). MBT has its roots in hardware testing, most notably telephone switches. However, it has recently spread to a variety of software domains. With the wide acceptance of UML and the advent of the UML 2.0 standard, many new MBT approaches which use at least some UML diagrams and some properly defined coverage criteria for the derivation of tests, have appeared and continue to appear today.

The use of UML models for test case generation has been proposed in various research publications. The objective of those approaches range from testing units (i.e., classes or modules), to testing an entire system. Moreover, they can be used for white-box testing or black-box verification.

SUMMARY OF THE INVENTION

Exemplary embodiments of the invention as described herein generally include methods and systems for applying Model-Based Testing for system validation of an embedded industrial control system. A method according to an embodiment of the invention uses UML Use Cases and Activity diagrams to respectively describe which functionalities should be tested and how to test them. The Category-Partition method is then used to introduce data into the UML model. The approach includes modeling, that is, creating UML use cases and activity diagrams from existing documentation, enhancing the models with testing requirements such as test coverage information and data variations, generating test cases in the form of interpreted scripts, and finally executing the test cases in a simulator, aiming to stimulate the application under test and automatically verify its response. Issues addressed by the described approach include (a) how to bridge the abstraction contained in the models to executable test cases; (b) how to ensure coverage with the minimal number of test cases; and (c) how to show direct traceability between required functionality and the results of test case execution. A method according to an embodiment of the invention is illustrated with an example from a train controller development project which shows that the approach is especially useful for verifying systems that can run in a simulated environment.

According to an aspect of the invention, there is provided a method for model-based testing of an industrial system, the method including modeling functionality of an industrial system using a modeling computer language, enhancing the model by adding functionality or refining existing functionality, generating test suites from the system model, and executing the test suites.

According to a further aspect of the invention, the modeling computer language is the Unified Modeling Language (UML), wherein modeling the system functionality comprises, defining UML use case diagrams to describe relationships among use cases specified for the system and actors who interact with the system according to the use cases, defining UML activity diagrams to model process logic of each use case, wherein the activity diagrams comprise a sequence of activities and transitions, and defining UML class diagrams to specify data categories and attributes that are inputs to the activities of the activity diagrams, wherein data categories relevant for a use case are modeled as test variables in the activity diagram.

According to a further aspect of the invention, enhancing the model comprises refining the activities of the activity diagrams.

According to a further aspect of the invention, enhancing the model comprises annotating the activity diagrams by attaching one or more notes containing data variable definitions to an activity to which the data serves as input.

According to a further aspect of the invention, a note defines a data variable as a UML class, wherein data values for the variable are taken from attributes of the class.

According to a further aspect of the invention, generating test suites from the system model comprises generating test paths from the UML activity diagrams and the class data, the test paths comprising a test case from each activity and transition in the activity diagram, wherein each data input is combined with its attached activity to generate the test case wherein the data values are inputs to the test case, wherein each test step requires the input to execute.

According to a further aspect of the invention, each transition is associated with a Boolean guard condition expressed in terms of the test variables that comprises a comparison of a category to one of its data choices.

According to a further aspect of the invention, the industrial system comprises a railroad train control system.

According to a further aspect of the invention, generating test suites further comprises generating instructions for field test engineers.

According to another aspect of the invention, there is provided a program storage device readable by a computer, tangibly embodying a program of instructions executable by the computer to perform the method steps for model-based testing of an industrial system.

DETAILED DESCRIPTION OF EXEMPLARY EMBODIMENTS

Exemplary embodiments of the invention as described herein generally include systems and methods for practical approaches of applying Model-Based Testing (MBT) in an industrial context. Accordingly, while the invention is susceptible to various modifications and alternative forms, specific embodiments thereof are shown by way of example in the drawings and will herein be described in detail. It should be understood, however, that there is no intent to limit the invention to the particular forms disclosed, but on the contrary, the invention is to cover all modifications, equivalents, and alternatives falling within the spirit and scope of the invention.

A method according to an embodiment of the invention improves approaches that target black-box system level testing, and uses Category Partition annotations. In a method according to an embodiment of the invention, UML Activity diagram are annotated instead of the textual use cases, and second, more precise structures based on a test specification language (TSL) based on the category-partition method are used, which leads to more consistent test scripts.

Figure 1:
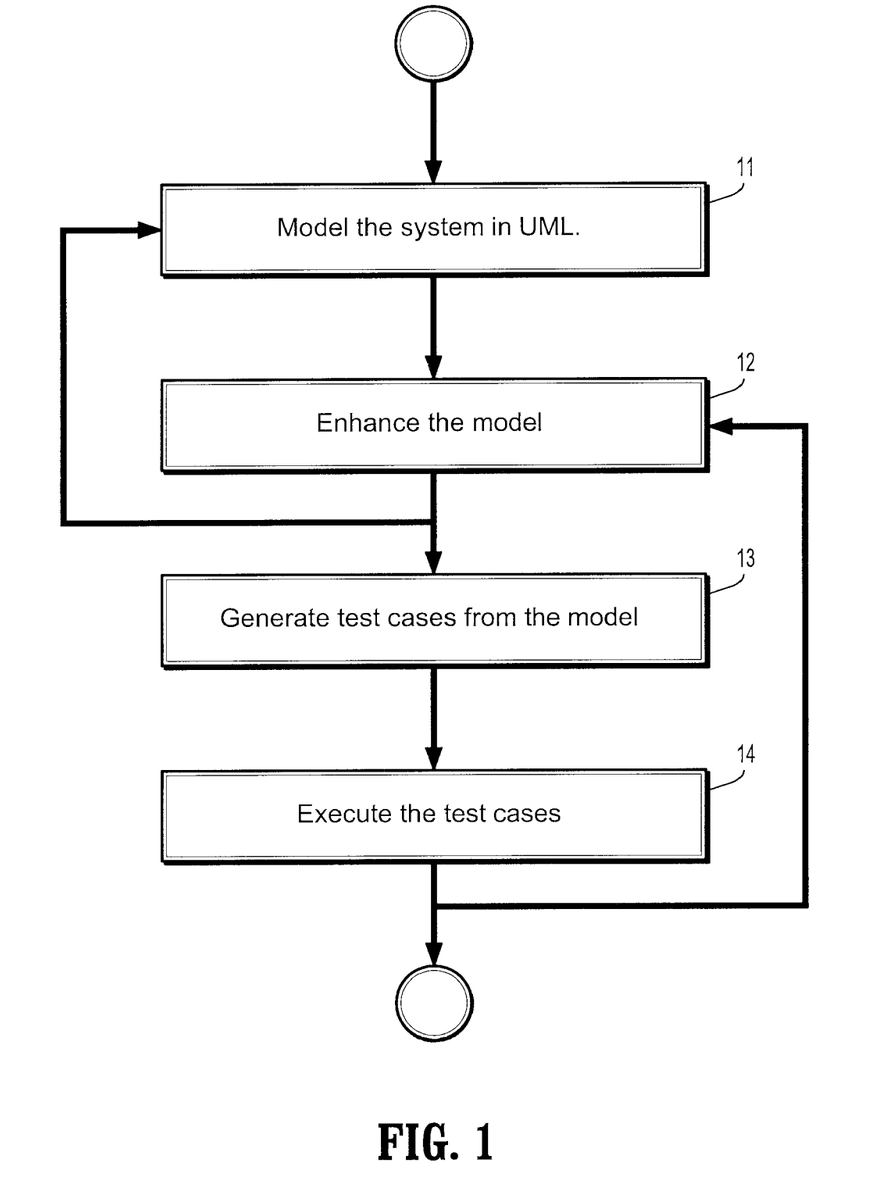
FIG. 1 is a flowchart illustrating the steps in an applied MBT approach, according to an embodiment of the invention.

FIG. 1 is a flowchart illustrating the steps in an applied MBT approach. Referring to the figure, a modeling process according to an embodiment of the invention includes the following steps: (11) modeling system behavior, (12) enhancing the models with testing information, (13) generating test suites, and (14) executing the test cases. It should be noted that the steps 11 and 12 can be performed through continual interaction, usually done in several cycles. Typically, new or missed functionalities are added to the model, or an existing model is re-specified/corrected, and the model is enhanced to refine the functionality. Furthermore, some mismatches are seen when the tester attempts to execute the test cases (or step 14). The models then need to be enhanced/refined to close the gap to the implementation and to allow an effective script generation.

Figure 2:
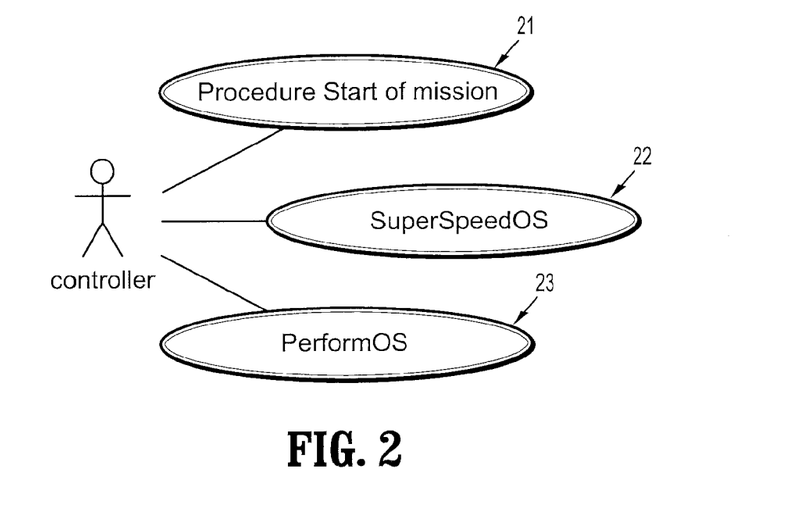
FIG. 2 is a use case diagram for an embedded controller example, according to an embodiment of the invention.

The concepts used in the approach according to an embodiment of the invention are described herein below in conjunction with a non-limiting example, that of an European Train Control System (ETCS) standard for a railroad train control system for cross-border traffic. The example is part of an ETCS specific project and it partially represents basic functionalities of the application. The approach is used to not only create, but also to execute test cases to achieve system validation of an embedded train controller. FIG. 2 depicts the UML use case diagram showing three basic functionalities for the train controller. The controller is required to implement "Procedure Start of mission" 21, "PerformOS" 22, and "SuperSpeedOS" 23. The function "Procedure Start of mission" 21 is the procedure to be executed so that the RBC starts to authorise the movements of a train. It specifies the set of actions for preparing a train to start a mission (trip). The abbreviation "OS" for "Onsight" is one mode in which a train can be controlled, where the RBC has no information as to whether the track is occupied and where the driver has the responsibility to drive in a way such that he/she can stop at any time in front of an obstacle. The function "PerformOS" 22 describes the activities performed while the train is in ETCS mode Onsight mode, while the function "SuperSpeedOS" 23 describes the speed supervision function while the train is in ETCS Onsight mode. The tasks of modeling, enhancing the models, generating test cases, and executing the test cases for the "Procedure Start of mission" will be described herein below. It is to be understood, however, that the ETCS example is presented for illustrative purposes only, and MBTs according to other embodiments of the invention can be applied in other industrial contexts.

Modeling

UML Use Case diagrams, such as those illustrated in FIG. 2, are used to describe the relationship among the diverse use cases specified for the system and the actors who interact with the system according to those use cases. UML Activity Diagrams are used to model the logic captured by a single use case and it is the basis for testing the functionalities and business rules described by the use cases.

The UML notation provides different diagrams for describing the system behavior, including interaction diagrams (i.e., sequence and collaboration), statechart diagrams, and activity diagrams. The purpose of interaction diagrams is to show messages being sent from one component to another. Despite the usefulness of this kind of information to verify the interaction of an embedded application with its surrounding environment (i.e., messages exchange between devices), the information conveyed by the interaction diagram is not essential for validating overall functionalities of an embedded application. Statechart diagrams focus on a component (or system) undergoing a process, changing internal states. Activity diagrams on the other hand focus on the flow of activities involved in the process. The semantics for the activity and statechart diagrams are related, since both (in UML1.x) followed finite state machine semantics. However, in UML2.0 activity diagrams follows the petri net semantics, making them more appropriate for modeling the concurrency of embedded controllers. Based on the assumption that activity diagrams better express how functionalities can be exercised in terms of workflow and concurrency, they will be used in this embodiment of the invention for verifying embedded controllers.

Figure 3:
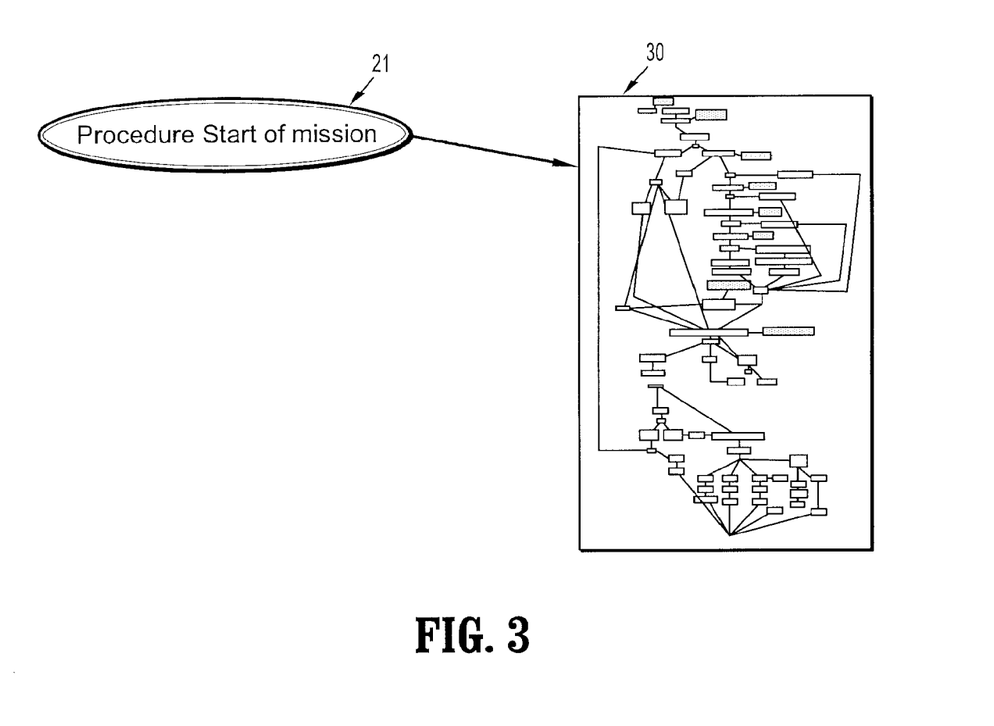
FIG. 3 presents an overview of the "Procedure Start of mission" activity diagram, according to an embodiment of the invention.

Modeling application behavior involves defining use cases and describing how to test these use cases with activity diagrams. The different paths through the activity diagram will later be used to construct test cases during test case generation. In an ideal situation, use case modeling is performed by analysts during the requirements phase. Alternatively, the models can be created for testing at a later point. However, in either case, the models (i.e., use case+activity diagrams) can be used as a representation of the functionalities to be tested and a roadmap of how to test them. FIG. 3 shows an overview of the activity diagram 30 used to describe the use case "Procedure Start Mission" 21. More details about this activity diagram will be described in the next section in connection with FIG. 5.

Enhancing the Models

Models typically need to be enhanced to capture the information needed for generating useful test cases. These enhancements can be classified into two types. The first is the refinement of activities of activity diagrams. This refinement generally leads to an improvement in the accuracy (e.g., decreasing the level of abstraction) of the described functionality, and consequently facilitating the efficiency of the test cases. The second type of model enhancement is characterized by annotations on the activity diagrams. An approach according to an embodiment of the invention supports annotations by using custom stereotypes in notes anchored to a particular activity in the diagram. A stereotype in UML is a way of extending the vocabulary of UML to create new model elements from existing model elements that have specific properties suitable for the particular problem domain. These stereotypes represent additional test requirements and are typically added by the test designer. Examples of annotations are data inputs, which are in the form of "categories". These data inputs are combined with the generated test paths and primarily influence the test generation process in terms of the number of test cases generated, functional coverage attained and data selected to be used in each test case. This combination of activity diagram and data annotation enables an approach according to an embodiment of the invention to reach a specific graph and data coverage during test case generation.

Underlying a UML-based testing approach is the category-partition method, which identifies behavioral equivalence classes within the structure of an application under test. A category or partition is defined by specifying all possible data choices that the category/partition can represent. Such choices can be either data values, references to other categories, or a combination of both. The data values become inputs to test cases and can be elements in guard conditions on transitions. In approach according to an embodiment of the invention, categories are represented by UML classes. The data choices for each category are the attributes of the class.

Figure 4:
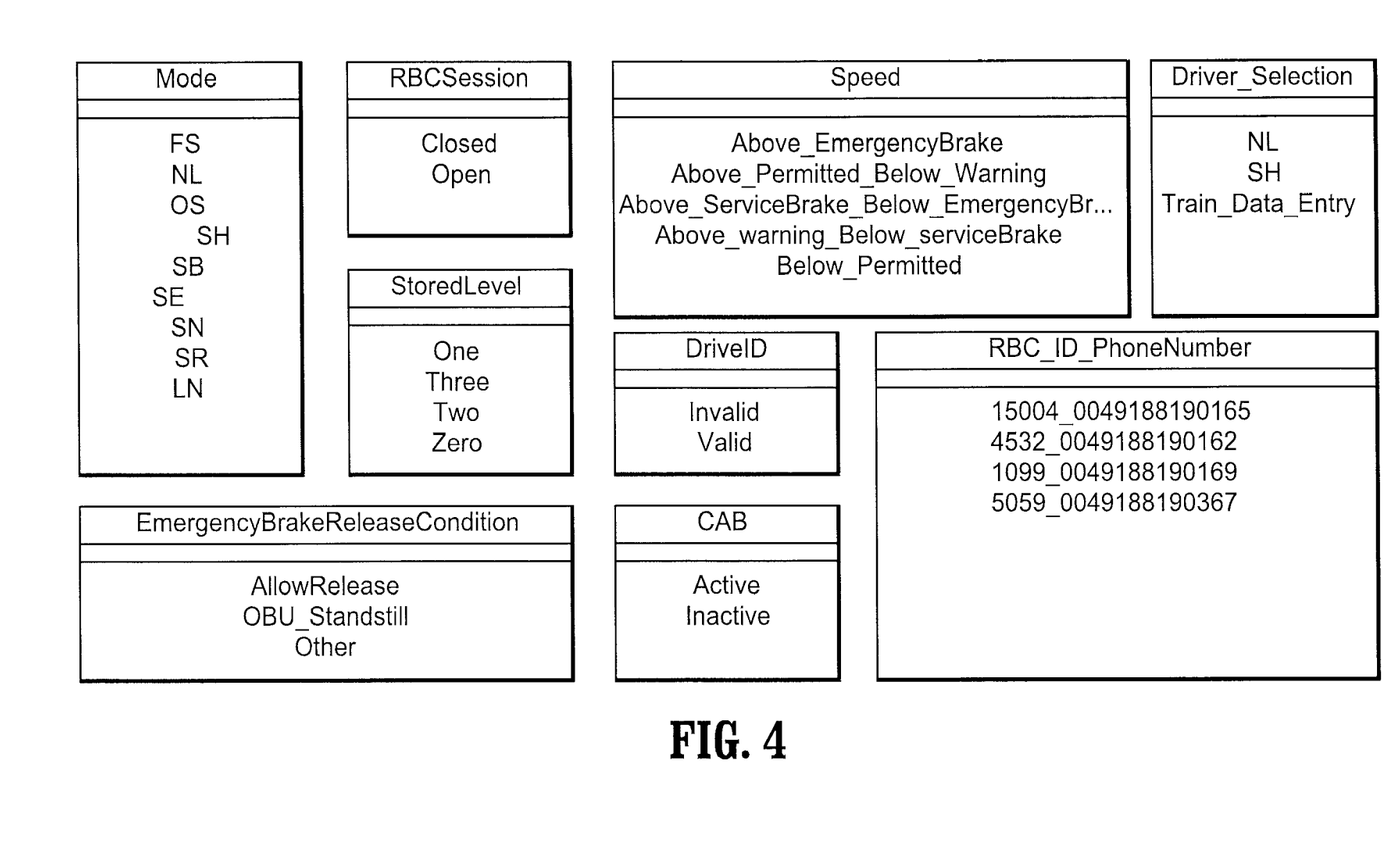
FIG. 4 illustrates the categories and choices for the ETCS example project, according to an embodiment of the invention.

FIG. 4 shows an excerpt of the class diagrams for the ETCS project example. The classes illustrated in the figure are as follows.

Class Mode: what kind of supervision is to be executed, what information is displayed to the driver, what information is accepted and how it is processed. The modes (attributes of class Mode) that ETCS defines include the following:

SB: Stand By: OBU awakes after being powered off, performs self tests, collects train data.

SH: Shunting: Supervision of movements is reduced such that shunting movements are possible.

FS: Full Supervision: OBU completely supervises the train.

UN: Unfitted: Reduced supervision such that OBU can operate on tracks that are not equipped with ETCS.

SR: Staff Responsible: Allow the driver to move the train under his/her own control in an ETCS equipped area.

OS: On Sight: Supervision in a track section that could be occupied by another train or any kind of obstacle.

NL: Non Leading: Train is a slave engine that is not remote controlled.

SE: STM European: same as SN, but for standard transmission module (STM) that adheres to the European Standard.

SN: STM National: OBU is supervised by a national train control system that translates the information from the STM to the OBU.

The modes listed here are exemplary, and form only a partial listing of all possible modes.

Class RBCSession" refers to the Radio Block Center session. The RBC receives information from the interlocking system and communicates with the train based on this information. An RBC session is a logical radio connection between an RBC and the train, i.e. the physical connection has been established and both parties have determined that they use the same version of the ETCS language. Short interruptions of the physical connection are allowed as long as they are pre-announced radio-holes or do not exceed a certain (configurable) time.

Class StoredLevel: StoredLevel corresponds to devices used for communication between the track and a train. ETCS has five defined levels: Level 0-Level 3 and Level STM. The ETCS levels are independent from the ETCS modes, although not all combinations are possible. When a train is powered off, it stores the level that is valid at that time in a permanent memory and reads it back when it is powered on again.

Class EmergencyBrakeReleaseCondition has three attributes: AllowRelease, OBU_Standstill, and Other.

Class DriveID refers to the driver identification and has two attributes: Invalid and Valid.

Class Speed has five attributes: Above_EmergencyBrake; Above_Permitted_Below_Warning; Above_ServiceBrake_Below_EmergencyBrake; Above_WarningBelow_ServiceBrake; and Below_Permitted.

Class CAB refers to the locomotive cabin, and has two values, Active and Inactive. A locomotive typically has two cabs on each side. The train is controlled from the active cab which has to be made active or inactive by a special procedure.

Class DriverSelection attributes stand for choices that are offered to the driver on the display: (1) NL: Enter NL: start the transition to ETCS mode Non Leading; (2) SH: start the transition to ETCS mode Shunting; and (3) Train Data Entry: start the procedure of entering the train data (e.g. maximum speed, braking capacity, train running number).

Class RBC_ID_PhoneNumber refers to phone numbers of train drivers, and has no specified maximum number of attributes.

Most of these categories are used in the "Procedure Start of mission" use case. This use case will require input data such as: Mode (i.e., on Board Unit (OBU) Mode). For each of these categories, the possible data choices are presented as class attributes. For example, there are nine choices for the Mode. These may be chosen carefully as too many data choices in a category may result in an explosion of test cases.

All data objects relevant for a use case are modeled as test variables in the activity diagram. The test variables are used to express the guard conditions in branches and to specify the data variations for test generation. The categories defined by classes, such as those shown in FIG. 4, provide the input data: the data choices in a category are the possible values of the variable. During test generation, the activity, which becomes a test step, requires one of the data choices of the category as an input in order to complete. Before using test variables in branching conditions or for data variations, they must be defined and associated to an activity (i.e., enhanced by an annotation). A variable is defined by a note with the stereotype to indicate a parsing tool to parse the data definition using the keyword "define" and followed by the name of the category. The note should be anchored to the activity where the data of the variable emerges, as the test generator must specify the value chosen for the variable/category at this particular step in the produced test cases. Once a variable has been defined, it can be used in the guard condition of a transition. A guard condition is a Boolean expression that contains a comparison of a category to one of its data choices.

Figure 5:
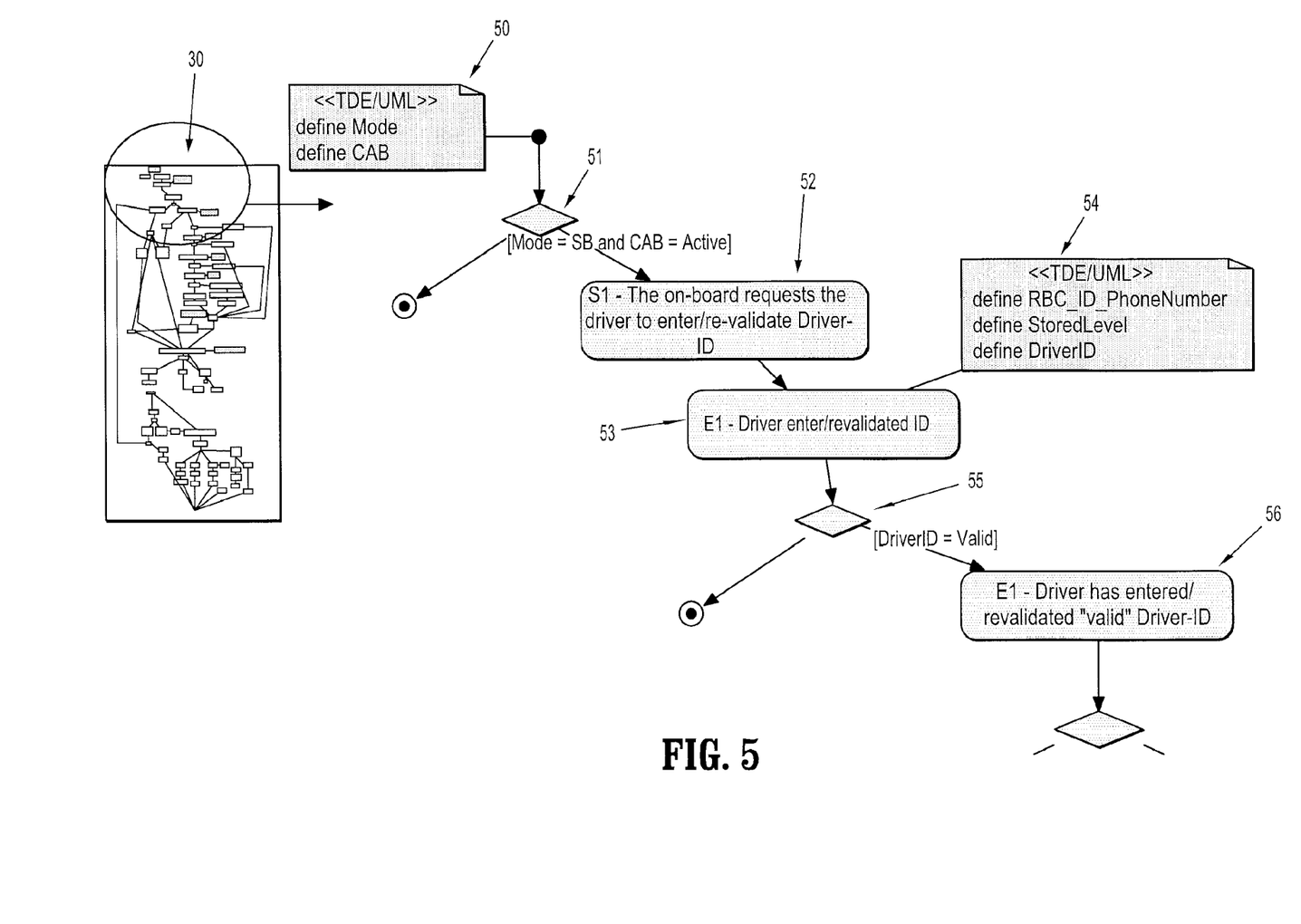
FIG. 5 depicts a sample of the "Procedure Start of mission" activity diagram, according to an embodiment of the invention.

To illustrate the above concepts, part of the "Procedure Start of mission" activity diagram 30 is highlighted in FIG. 5. The use case "Procedure Start of mission" requires a specific OBU Mode and CAB attribute in order to be performed (i.e., precondition). To model this, the variables "Mode" and "CAB" are introduced from categories of the same name, shown in the annotation 50 in FIG. 5. The "<<TDE/UML>>" in the note is a stereotype that indicates that a test development environment UML tool should parse and interpret the note. Then, a guard "[Mode=SB and CAB=Active]" in a transition 51 out from the initial state declares that "Mode" needs to be set to "SB" (i.e., stand by) and "CAB" to be active. If otherwise, the test case execution will terminate. In an approach according to an embodiment of the invention, guard conditions of the transitions coming out of a decision point do not need to be mutually exclusive or even be deterministic. The lack of any guards on the transitions (from the same decision) indicates that each path is valid for any set of data values. If there is a guard on just one branch, the other branches are assumed to mean "otherwise". Next in this use case, the driver is requested at activity 52 to enter/revalidate his/her identification, after which the driver enters/revalidates his/her identification at activity 53. The enter/revalidation activity 53 requires specific class attribute values as input, for which the variables "RBC_ID_PhoneNumber", "StoredLevel", and "DriverID", taken from the classes of FIG. 4, are declared in annotation 54. The guard "[DriverID=Valid]" is tested at transition 55. If the entered identification is valid, the test path will continue to activity 56, otherwise "DriverID", the execution will terminate if the DriverID is invalid. In the test generation phase, the test paths containing this transition would only have those data combinations for which "Valid" is the data choice for DriverID. In the case of the defined variable "StoredLevel", which contains 4 allowed choices according to FIG. 4, the generator will chose the value to be used in the test cases, since there is no restriction (guard in a transition) to limit the selected choices.

Generating Test Cases

Before proceeding with a description of the test generation characteristics, it should be noted that this approach generates a set of functional conformance tests. These test cases verify the compliance of what is implemented to what was modeled. It is assumed that the implementation behaves in a deterministic and externally controllable way. Otherwise, the generated test cases may be ineffective. From the UML activity diagram and the category data, test paths can be automatically created.

Based on previous experiences with template generators, a test case generator according to an embodiment of the invention can be built based on the following design principles: (1) generated files should not require any manual change; (2) the generated test scripts should be immediately executable; (3) the framework should be flexible to allow adding new choices without manual coding and to allow changes being promoted to the execution of scripts; (4) the reuse of a test case should be supported in other locations, for another project and for another test environment.

Figure 6:
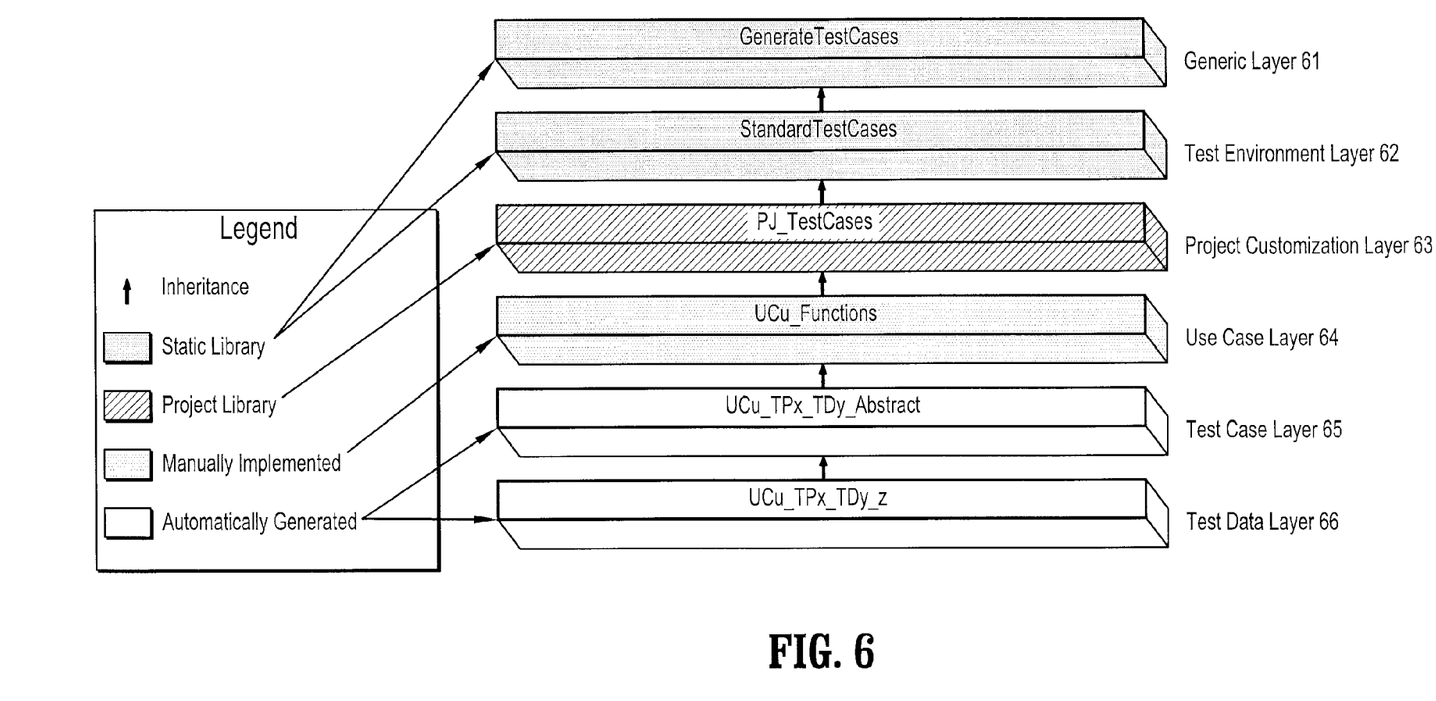
FIG. 6 is a schematic block diagram of the ETCS Test Framework Architecture, according to an embodiment of the invention.

A multi-layered test generator architecture according to an embodiment of the invention with a strict separation of concerns is shown in FIG. 6. The test generator architecture includes a Generic Layer 61, a Test Environment Layer 62, a Project Customization Layer 63, a Use Case Layer 64, a Test Case Layer 65, and a Test Data Layer 66. Each layer can be represented by an object or class that inherits from the layer below. The layers are described as follows.

(A) Generic Layer:

This layer is responsible for the generic test case logic. Pseudo code for the most important method is as follows.

```
Method run
    initTestEnvironment
    establishPrecondition
    checkPrecondition
    body
    checkPostcondition
end
```

All methods called by the method run are virtual methods and need to be filled out by concrete instances. Details such as exception handling, timeout handling and managing the test protocol, that are all handled at this level have been left out.

(B) Test Environment Layer:

This layer provides the necessary functionality to set up the test environment. It defines the method initTestEnvironment. In a test environment according to an embodiment of the invention, other virtual functions should be introduced that define the track data to be used, the train type, and the initial state of the environment, e.g. of signals and switches. The test environment layer also contains a library to access the functionality of the test environment in a more testing friendly way.

Both the Generic Layer and the Test Environment Layer make use of a static library, which is a library that is not to be changed during the project. Typically, the static library is a program library used to link to external functions and variables in a caller.

(C) Project Customization Layer:

The project customization layer contains definitions for easy access to the proper track data and train types as well as a project-specific library of methods. The project customization layer provides a link between the test environment and the way it is used in the project. As an example, a definition is provided for "initTrackFile":

```
def initTrackFile # :nodoc:
    case @p_strecke
    when "JHL"
        p = "route_map_files/standard_TuS_9001.xml"
    when "NBS"
        p = "route_map_files/EngDataNBS1402a_TUS.xml"
    when "LBL"
        p = "route_map_files/TUS_lbl_r0103v1101.xml"
    else
        logFatal("track file for p_strecke
            #{@p_strecke.class.to_s} unknown")
    end #case
    return p
end
```

The test environment expects a file name. In the project, three specific track files were used with well known and defined short names. The test engineer can thus use the known abbreviations. In general, the project customization layer serves to provide the test environment layer with the proper definitions and initializations that do not vary within the project.

(D) Use Case Layer:

The use case definition layer is coded by the test engineer. It is at this level that the UML diagrams are specified for modeling the system, and where the annotations are performed. The test engineer has to provide definitions for the method establishPrecondition, and for all the methods that will be used in the automatic definition of the methods checkPrecondition, body, and checkPostcondition. The test script generation tool needs to be able to produce such a list. The coding should be done in a way that allows for different test cases to use the same method. The test engineer may use variables that contain the information as to which choice is currently valid for which category, e.g. to decide which speed should be used in this test case. Again, the test case engineer needs to know how to access this information. Coding the use case layer is more complicated than coding a single use case and it may require more time than the coding of the separate test cases. However, flexibility is gained, for example, when it is decided that more test cases are needed (more choices in a category), or when the logic changes.

(E) Test Case Layer:

The test case layer is automatically generated, and is where the UML diagrams specified in the Use Case Layer are interpreted to generate code. For each combination of test path and test data the proper variable definitions and method calls are generated. Since everything else is taken care of in the other layers, the automatic generated code is quite simple and looks as follows.

```
class TestCase_Path0_Data0 inherits from ...
    method new
        var_cat1 = "choise1"
        var_cat2 = "choide2"
        ...
    end
    method checkPrecondition
        checkMethod1
        checkMethod2
        ...
    end
    method body
        methodStep1
        methodStep2
        ...
    end
    method checkPostcondition
        checkMethodX
        checkMethodX+1
        ...
    end
```

The test script generation tool thus needs to have only a limited knowledge of the test environment. The script language is fixed, of course, but the set up of the test environment does not need to be coded into the generated test script. Note that no human editing of the generated code is required. Everything that needs to be defined is defined in the Use Case Layer. This test script is executable. In order to run it, one only needs to create an instance of it and in it:

```
tc = TestCase_Path0_Data0.new
tc.run
```

(F) Test Data Layer:

The test data layer contains definitions for the parameters, i.e. the variables that allow the test case to be reused in other locations. It can be automatically generated because the data can be taken from the data entered in another tool, such as the field test editor. However, this data can also be entered manually.

Executing Test Cases

The test cases had to be executed not only in a simulation laboratory environment but also in the field, i.e., with a real locomotive on an actual track. For that purpose, not only did executable test scripts need to be generated, but also instructions for the field test engineers. In executing these test cases, there was another set of variables to be specified. These concerns those attributes that do not influence the test case execution directly but need to be recorded in case problems should occur. These attributes are, for example, train type, train length, etc., but most important the exact location where the test case is to be executed. In order to maintain a consistent set of parameters between laboratory and field test cases, the parameters were kept under control of the test case generator. This led to the introduction of yet another layer that inherits from the test data layer and defines the location parameters.

The results from the application of a method according to an embodiment of the invention to an ETCS project, have so far been very encouraging, but also show that it is important to assess the details of the implementation, and to address obstacles quickly. Small details may otherwise cause a halt in the testing process that is not acceptable in an industrial environment. Experience shows that MBT at first does not necessarily induce a gain with respect to traditional approaches, but as project develops and changes are necessary, the MBT approach shows its usefulness.

System Implementation

It is to be understood that embodiments of the present invention can be implemented in various forms of hardware, software, firmware, special purpose processes, or a combination thereof. In one embodiment, the present invention can be implemented in software as an application program tangible embodied on a computer readable program storage device. The application program can be uploaded to, and executed by, a machine comprising any suitable architecture.

Figure 7:
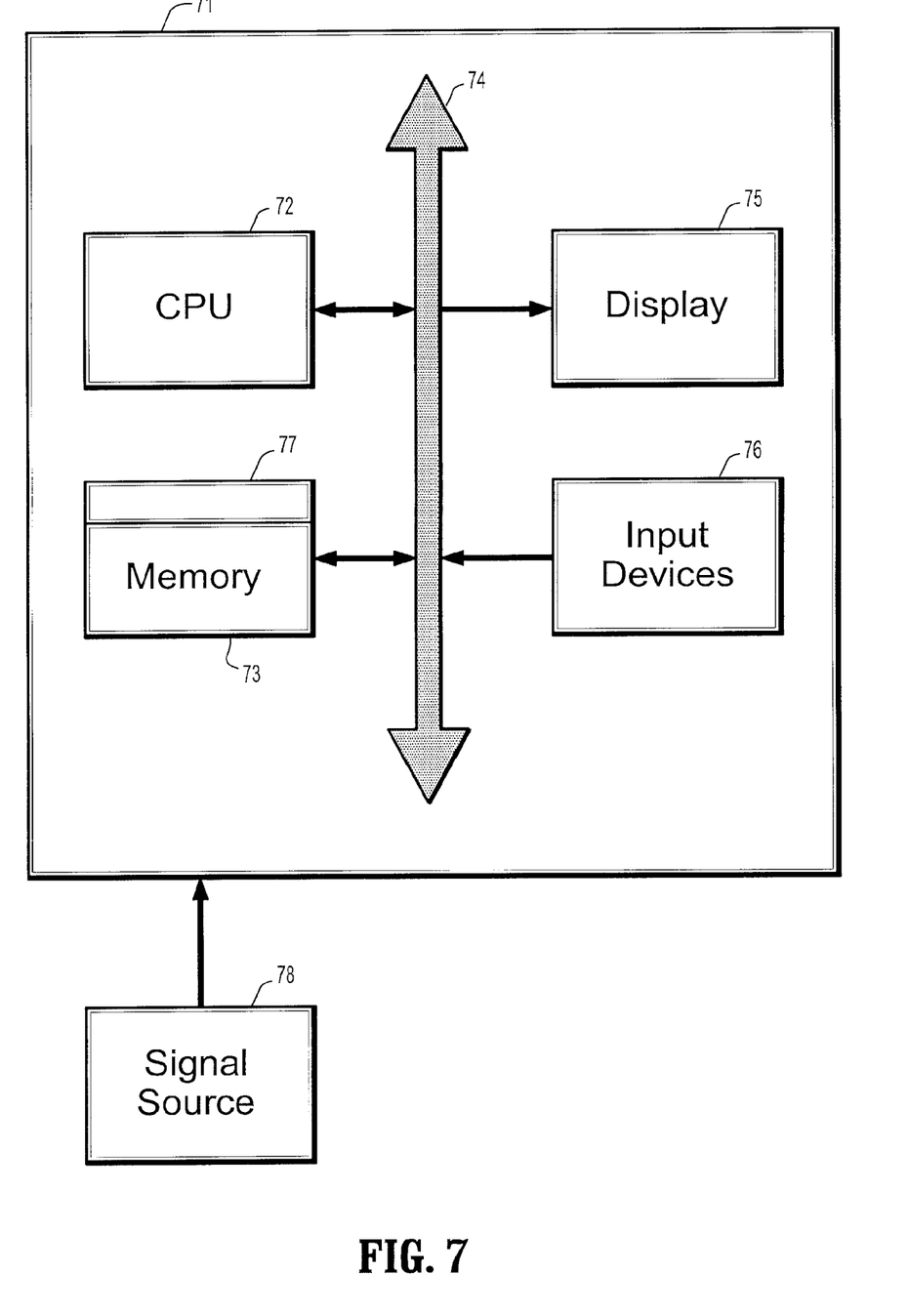
FIG. 7 is a block diagram of an exemplary computer system for implementing practical approaches of applying Model-Based Testing (MBT) in an industrial context, according to an embodiment of the invention.

FIG. 7 is a block diagram of an exemplary computer system for implementing a method for applying Model-Based Testing (MBT) in an industrial context, according to an embodiment of the invention. Referring now to FIG. 7, a computer system 71 for implementing the present invention can comprise, inter alia, a central processing unit (CPU) 72, a memory 73 and an input/output (I/O) interface 74. The computer system 71 is generally coupled through the 110 interface 74 to a display 75 and various input devices 76 such as a mouse and a keyboard. The support circuits can include circuits such as cache, power supplies, clock circuits, and a communication bus. The memory 73 can include random access memory (RAM), read only memory (ROM), disk drive, tape drive, etc., or a combinations thereof. The present invention can be implemented as a routine 77 that is stored in memory 73 and executed by the CPU 72 to process the signal from the signal source 78. As such, the computer system 71 is a general purpose computer system that becomes a specific purpose computer system when executing the routine 77 of the present invention.

The computer system 71 also includes an operating system and micro instruction code. The various processes and functions described herein can either be part of the micro instruction code or part of the application program (or combination thereof) which is executed via the operating system. In addition, various other peripheral devices can be connected to the computer platform such as an additional data storage device and a printing device.

It is to be further understood that, because some of the constituent system components and method steps depicted in the accompanying figures can be implemented in software, the actual connections between the systems components (or the process steps) may differ depending upon the manner in which the present invention is programmed. Given the teachings of the present invention provided herein, one of ordinary skill in the related art will be able to contemplate these and similar implementations or configurations of the present invention.

While embodiments of the present invention has been described in detail with reference to a preferred embodiment, those skilled in the art will appreciate that various modifications and substitutions can be made thereto without departing from the spirit and scope of the invention as set forth in the appended claims.

What is claimed is:

1. A system having a central processing unit for model-based testing of an industrial system, comprising:
    a generic test case layer that includes virtual functions for initializing a test environment, establishing preconditions, checking preconditions, and checking postconditions;
    a test environment layer that includes additional virtual functions needed to defines the initial state of the industrial system being tested, and a library that accesses functionality of the test environment;
    a use case definition layer for generating UML diagrams and annotations that model the industrial system and that defines the functions for establishing preconditions, checking preconditions, executing the test cases, and checking postconditions, wherein the annotations comprise annotating UML activity diagrams by attaching one or more notes containing data variable definitions to an activity to which said data serves as input and using-custom stereotypes in notes anchored to a particular activity in the UML activity diagrams; and
    a test case layer that interprets said UML diagrams to generate test cases for testing said UML model.

2. The system of claim 1, further comprising a project customization layer containing a plurality of data definitions and initializations specific to the industrials system being modeled.

3. The system of claim 1, further comprising a test data layer containing definitions for all data parameters used by said test case layer.

4. The system of claim 1, wherein said UML diagrams for modeling said industrial system include:
    use case diagrams to describe relationships among use cases specified for said system and actors who interact with the system according to said use cases,
    activity diagrams to model process logic of each use case, wherein said activity diagrams comprise a sequence of activities and transitions, and
    class diagrams to specify data categories and attributes that are inputs to the activities of said activity diagrams, wherein data categories relevant for a use case are modeled as test variables in the activity diagram.

5. The system of claim 4, wherein said test case layer generates test paths from said UML activity diagrams and said class data, said test paths comprising a test case from each activity and transition in said activity diagram, wherein each data input is combined with its attached activity to generate said test case wherein the data values are inputs to said test case, wherein each test step requires said input to execute.

6. A non-transitory program storage device readable by a computer, tangibly embodying a program of instructions executed by the computer to implement a system for model-based testing of an industrial system, comprising:
    a generic test case layer that includes virtual functions for initializing a test environment, establishing preconditions, checking preconditions, and checking postconditions;
    a test environment layer that includes additional virtual functions needed to defines the initial state of the industrial system being tested, and a library that accesses functionality of the test environment;
    a use case definition layer for generating UML diagrams and performing annotations that model the industrial system and that defines the functions for establishing preconditions, checking preconditions, executing the test cases, and checking postconditions, wherein the annotations comprise annotating UML activity diagrams by attaching one or more notes containing data variable definitions to an activity to which said data serves as input and using-custom stereotypes in notes anchored to a particular activity in the UML activity diagrams; and
    a test case layer that interprets said UML diagrams to generate test cases for testing said UML model.

7. The computer readable program storage device of claim 6, wherein the system further comprises a project customization layer containing a plurality of data definitions and initializations specific to the industrials system being modeled.

8. The computer readable program storage device of claim 6, wherein the system further comprises a test data layer containing definitions for all data parameters used by said test case layer.

9. The computer readable program storage device of claim 6, wherein said UML diagrams for modeling said industrial system include:
    use case diagrams to describe relationships among use cases specified for said system and actors who interact with the system according to said use cases,
    activity diagrams to model process logic of each use case, wherein said activity diagrams comprise a sequence of activities and transitions, and
    class diagrams to specify data categories and attributes that are inputs to the activities of said activity diagrams, wherein data categories relevant for a use case are modeled as test variables in the activity diagram.

10. The computer readable program storage device of claim 9, wherein said test case layer generates test paths from said UML activity diagrams and said class data, said test paths comprising a test case from each activity and transition in said activity diagram, wherein each data input is combined with its attached activity to generate said test case wherein the data values are inputs to said test case, wherein each test step requires said input to execute.

* * * * *